United States Patent [19]

Scotson

[11] Patent Number: 4,969,439

[45] Date of Patent: Nov. 13, 1990

[54] ADAPTIVE CONTROL SYSTEM FOR AN INTERNAL COMBUSTION ENGINE

[75] Inventor: Peter G. Scotson, West Midlands, United Kingdom

[73] Assignee: Lucas Industries Public Limited Company, Birmingham, England

[21] Appl. No.: 243,343

[22] Filed: Sep. 12, 1988

[51] Int. Cl.$^5$ .............................. F02P 5/06
[52] U.S. Cl. .............................. 123/419; 123/478; 123/425; 364/436.05
[58] Field of Search .............. 123/419, 478, 418, 425, 123/416, 417; 364/431.05, 431.04, 431.08

[56] References Cited

U.S. PATENT DOCUMENTS

| | | | |
|---|---|---|---|
| 3,142,967 | 8/1964 | Schweitzer | 60/105 |
| 3,327,553 | 6/1967 | Peras | 74/472 |
| 4,026,251 | 5/1977 | Schweitzer | 123/32 |
| 4,138,979 | 2/1979 | Taplin | 123/119 |
| 4,181,944 | 1/1980 | Yamauchi et al. | 364/431 |
| 4,257,377 | 3/1981 | Kinugawa et al. | 123/492 |
| 4,259,723 | 3/1981 | Fujisawa et al. | 364/431 |
| 4,268,910 | 5/1981 | Omori et al. | 365/431 |
| 4,276,860 | 7/1981 | Capurka | 123/415 |
| 4,306,284 | 12/1981 | Malcolm | 364/148 |
| 4,319,327 | 3/1982 | Higashiyama et al. | 364/431.05 |
| 4,328,779 | 5/1982 | Hattori et al. | 123/416 |

(List continued on next page.)

FOREIGN PATENT DOCUMENTS

| | | | |
|---|---|---|---|
| 0044656 | 7/1981 | European Pat. Off. | |
| 0155680 | 3/1985 | European Pat. Off. | |
| 1543379 | 2/1975 | Fed. Rep. of Germany | 123/419 |
| 2930540 | 2/1981 | Fed. Rep. of Germany | |
| 1257779 | 12/1971 | United Kingdom | |
| 1491622 | 1/1975 | United Kingdom | |
| 2005443 | 9/1979 | United Kingdom | |
| 2024462 | 1/1980 | United Kingdom | 123/419 |
| 2049238 | 4/1980 | United Kingdom | |
| 2042637 | 9/1980 | United Kingdom | |
| 2060062 | 9/1980 | United Kingdom | |
| 2099918 | 4/1982 | United Kingdom | |
| 2107785 | 10/1983 | United Kingdom | |
| 2140082 | 5/1984 | United Kingdom | |
| 2165063 | 1/1985 | United Kingdom | |
| 2178195 | 7/1985 | United Kingdom | |
| 2169956 | 12/1986 | United Kingdom | |

OTHER PUBLICATIONS

"Electronic Spark Timing Control for Motor Vehicles", Society of Automotive Engineers Technical Paper Series, Jun. 5-9, 1978, 780,655, by Paul H. Schweitzer and Thomas W. Collins.

"Flame Arrival Sensing Fast Response Double Closed Loop Engineer Management", No. 84044 by Michael G. May, Antipollution Industrial Research S.A.

Carrigues et al., An Extrema Searching Controlled for Mixture Strength Optimization on an Internal Combustion Engine, European Conference on Electronics, Mar. 28, 1980.

Optimizing Control of Diesel Injection Timing, D. B. Kittelson and M. J. Pipho, University of Minnesota, U.S.A.

Lean Limit A/F Control System by Using Engine Speed Variation, Ina et al., SAE Paper 860413

*Primary Examiner*—Raymond A. Nelli
*Attorney, Agent, or Firm*—Nixon & Vanderhye

[57] ABSTRACT

Disclosed is a method and apparatus for controlling operation of an engine whereby there is a known general function relating an engine control input to the engine output. This known control function has a number of structures or method steps which accomplish the following functions. The value of at least one engine output is measured; a base value of at least one engine input is supplied. A value of the engine output is determined based upon a predetermined function of the base value of the supplied engine control input; the measured value of the engine output is compared with the determined value of the engine output; in response to the comparison, base values of the two parameters in the predetermined function are adjusted; and the base value of the engine control input is adjusted based upon the adjustment to the two parameters.

26 Claims, 5 Drawing Sheets

U.S. PATENT DOCUMENTS

| | | | |
|---|---|---|---|
| 4,344,140 | 8/1982 | Leung | 364/431 |
| 4,351,281 | 9/1982 | Geiger et al. | 123/425 |
| 4,357,662 | 11/1981 | Schira et al. | 364/431.08 |
| 4,375,668 | 3/1983 | Leung et al. | 364/431.08 |
| 4,379,239 | 4/1983 | Knuefelmann et al. | 307/268 |
| 4,379,333 | 4/1983 | Nonomiya et al. | 364/431.05 |
| 4,381,784 | 5/1983 | Aberson | 123/414 |
| 4,389,992 | 6/1983 | Shigematsu et al. | |
| 4,403,584 | 4/1983 | Suzuki et al. | 123/417 |
| 4,433,381 | 2/1984 | Wilkinson | 364/431.05 |
| 4,448,162 | 5/1984 | Ninomiya et al. | 123/419 |
| 4,454,750 | 6/1984 | Yoshida et al. | 73/35 |
| 4,467,765 | 8/1984 | Suzuki et al. | 123/419 |
| 4,471,736 | 9/1984 | Yoshida et al. | 123/425 |
| 4,478,185 | 10/1984 | Obayashi et al. | 123/419 |
| 4,479,476 | 10/1984 | Suzuki et al. | |
| 4,502,442 | 3/1985 | Takakuwa et al. | 123/417 |
| 4,515,718 | 4/1985 | Ishii et al. | 123/425 |
| 4,527,524 | 7/1985 | Guipaud | |
| 4,535,406 | 8/1985 | Johnson | 364/431 |
| 4,547,852 | 10/1985 | Kamufugi et al. | 364/431.04 |
| 4,575,800 | 3/1986 | Kittelson | 364/431.05 |
| 4,653,449 | 3/1987 | Kamei et al. | 123/478 |
| 4,691,286 | 9/1987 | Obayashi et al. | 364/431.04 |
| 4,706,196 | 11/1987 | Muramatsu et al. | 364/431.05 |
| 4,799,469 | 1/1989 | Nagano et al. | 123/418 |

ADAPTIVE CONTROL SYSTEM FOR AN INTERNAL COMBUSTION ENGINE

BACKGROUND OF THE INVENTION

1. Field of the Invention

This invention relates to an adaptive control system for an internal combustion engine and also to a method of controlling such an engine.

2. Discussion of Related Art

In operating an internal combustion engine, it is necessary to establish values for various control parameters and, depending upon the particular control parameter, the value of the parameter may be varied continuously in accordance with one or more operating parameters of the engine.

In a spark ignition engine, for each ignition spark or engine fire in one of the engine cylinders, an ignition timing parameter in the form of the spark advance angle must be established at the right moment to produce the peak combustion pressure soon after the piston has passed the top dead centre position so as to produce the optimum contribution to the output of the engine. Because the flame speed varies with the density of the air/fuel mixture, it is generally necessary to increase the spark advance angle with decreasing cylinder filling pressure. The spark advance must also be increased with increasing engine speed so as to allow for extra rotation of the engine crank shaft whilst the air/fuel mixture burns.

Until recently, the spark advance angle was established by a mechanical device responsive to manifold depression and engine speed. Such a mechanical device establishes the spark advance angle as a simple function of engine speed and load demand as represented by the manifold depression. Careful testing of engines shows that the ideal spark advance angle is a complex function of load and speed and this function cannot be matched by a mechanical device. Modern ignition systems now use empirically derived characteristics for the spark advance angle which are stored as a look up table in a read only memory.

These spark advance characteristics are determined by testing a number of samples of an engine and establishing an optimum spark advance angle for each load/speed point. A value for the spark advance angle for each point is then chosen which will give good economy subject to meeting various constraints such as low emissions and low knock levels.

Although this provides a much closer match to the optimum spark advance angle than was achieved with the mechanical devices, it still does not give the engine user the best possible spark advance angle for his engine throughout its life. There are a number of reasons for this. It is not possible to test enough engines to provide good statistics and the engines available during tests are often different from production engines. Also, variations in the engine characteristics may occur due to manufacturing tolerances and from small changes in engine design. During the life of an engine, various ageing effects will occur in the engine and in the sensors, actuators and electronic circuitry and these will create a mismatch between the optimum characteristics and those stored in the read only memory.

In U.S. Pat. No. 4,379,333, there is described an adaptive control system for controlling the spark advance angle. In this system, small positive and negative perturbations are superimposed on the spark advance angle and the resulting changes in engine speed are used to determine the differential or slope of engine output with respect to spark advance angle.

According to the sign of the slope measurement, a correction is then made to a schedule of spark advance angles. The slope measurement is then repeated and the first slope measurement is replaced by a completely new measurement without any reference to the first measurement of the slope. The new measurement is used to make a further correction to the schedule of spark advance angles.

If the load and speed have remained steady, the same element in the schedule will be additively corrected in correspondence to successive slope measurements. Thus, information gathered in previous measurements of the slope is retained in the schedule element for a while, this information being progressively diluted as new data becomes available.

If the slope of engine output with respect to spark advance is positive, the values for the spark advance angle will be progressively increased until eventually the maximum value of engine output is achieved or exceeded and the slope measurements decay to zero or change sign. The correction process will then be driven only by errors in the slope measurements which will cause small random wanderings in the values of the spark advance angle about the optimum value.

The general form of the function relating engine output to the spark advance angle is known to be a fairly simple curve with a single maximum of engine output. Because the system of U.S. Pat. No. 4,379,333 drives the spark advance angle towards the value which gives maximum engine output, some knowledge of this relationship is implicit in the design of this system. However, because the system of U.S. Pat. No. 4,379,333 corrects the spark advance angle in a progressive manner rather than making an estimate of the spark advance angle which gives maximum engine output, the system does not take full advantage of knowledge of this relationship.

Under certain engine operating conditions, such as idling, it is sometimes necessary to reduce the spark advance angle from the value which gives maximum engine output. This is done in order to reduce emission of pollutants or to reduce knock. Under such conditions U.S. Pat. No. 4,379,333 inhibits correction of the spark advance angle. Thus, under such operating conditions, U.S. Pat. No. 4,379,333 takes no advantage of knowledge of the relationship between spark advance angle and engine output and loses the advantage inherent in an adaptive control system.

Similar considerations to those discussed above apply to other engine control parameters, such as mixture composition in the case of a spark ignition engine, or injection timing or amount of fuel injected in the case of a compression ignition engine.

SUMMARY OF THE INVENTION

It is an object of this invention to provide a new or improved adaptive control system for an internal combustion engine and also to provide a method of controlling such an engine in which greater advantage is taken of the relationship between output and a particular control parameter.

According to one aspect of this invention, there is provided an adaptive control system for an internal combustion engine, said control system comprising (1)

means for providing an indication of an engine control parameter (hereinafter referred to as "said monitored control parameter"), (2) means for measuring an engine output parameter, (3) means responsive to said monitored control parameter and said engine output parameter for estimating at least two parameters (hereinafter referred to as "said estimated parameters") which together define the relationship between said monitored control parameter and said engine output parameter, and (4) means responsive to said estimated parameters for adjusting an engine control parameter (hereinafter referred to as "said adjusted parameter").

With the adaptive control system of this invention, by estimating the parameters which together define the relationship between said monitored control parameter and said engine output parameter, much greater advantage is taken of knowledge of this relationship. With this invention, said adjusted parameter may be moved rapidly rather than progressively to an optimum value.

Preferably, said control system includes a perturbation generator for applying perturbations to said monitored control parameter.

Preferably, the estimating means estimates only two parameters.

Preferably, the adjusting means adjusts said adjusted control parameter so as to cause the engine to operate at a predetermined point on the curve which defines the relationship between said monitored control parameter and said engine output parameter. For example, the predetermined point may be the point at which a maximum value is achieved for said engine output parameter.

Desirably, said control system includes means for storing values of said estimated parameters as a function of engine operating conditions.

Conveniently, the estimating means includes means for calculating successive sets of difference values, each set of difference values comprising a value indicative of the difference between the present value and a preceding value of said monitored control parameter, the difference between the square of the present value and the square of the preceding value of said monitored control parameter, and the difference between the present value and the preceding value of said engine output parameter.

Desirably, the estimating means includes means for constraining the value of said estimated parameters supplied by the estimating means to the adjusting means.

Said monitored control parameter and said adjusted parameter may be the same parameter and this same parameter may be an ignition timing parameter.

However, said monitored control parameter and said adjusted parameter are not necessarily the same parameter. For example, said monitored control parameter may be an ignition timing parameter while said adjusted parameter is a parameter related to the fuelling of the engine.

According to another aspect of this invention, there is provided a method of controlling an internal combustion engine, said method comprising the steps of providing an indication of an engine control parameter (hereinafter referred to as "said monitored control parameter"), measuring an engine output parameter, using said monitored control parameter and said engine output parameter to estimate at least two parameters (hereinafter referred to as "said estimated parameters") which together define the relationship between said monitored control parameter and said engine output parameter, and using said estimated parameters to adjust an engine control parameter (hereinafter referred to as "said adjusted control parameter").

BRIEF DESCRIPTION OF THE DRAWINGS

This invention will now be described in more detail, by way of example, with reference to the drawings in which.

DETAILED DISCUSSION OF PREFERRED EMBODIMENTS

Figure 1:
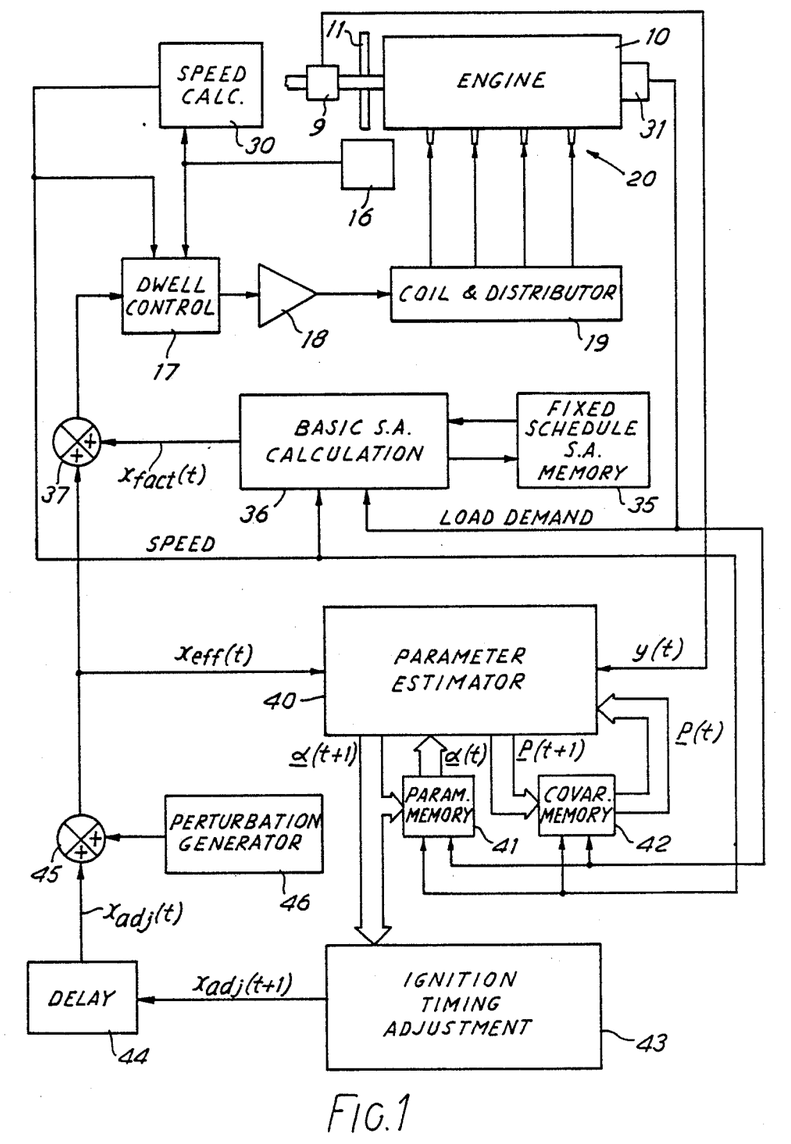
FIG. 1 is a block diagram of an adaptive control system embodying this invention.

Referring now to FIG. 1 there is shown an adaptive control system for a four cylinder spark ignition engine 10. The system includes an engine output measuring device in the form of a torque transducer 9, and a position transducer 16 coacting with a disc 11 rotating with the engine crankshaft to give a series of pulses indicating the position of the crankshaft. These pulses are supplied to an engine control input dwell control device 17, the output of which is coupled through a power stage 18 to a coil and distributor 19. The coil and distributor 19 are connected to spark plugs 20 and cause ignition sparks to occur at these plugs at appropriate moments.

The output of transducer 16 is also coupled to a speed calculation device 30 which calculates engine speed and supplies this to the dwell control device 17.

The engine is provided with a transducer 31 which measures the load demand to which the engine is subjected. In the present example, the transducer 31 measures the pressure in the inlet manifold for the engine cylinders. The load demand could also be detected by measuring other quantities such as the throttle valve opening position or the rate of air flow into the inlet manifold.

The system also includes a memory 35 in which is stored a two dimensional array of spark advance angles, the abscissa and ordinate of the array corresponding to engine speed and load demand. The memory 35, and the outputs of the speed calculation device 30 and transducer 31 are connected to a calculation device 36. For each prevailing engine speed and load demand, the calculation device 36 calculates a basic value $x_{fact}(t)$ for spark advance and supplies this to one input of a summer 37. The calculation device 36 calculates this basic value from the spark advance values stored in the array in memory 35 at the four points in the speed/load plane surrounding the prevailing engine speed and load demand. Each of these values is multiplied by an appropriate weighting factor and the four resulting values are added to provide the basic spark advance value. Thus, the calculation device 36 calculates the basic spark advance value by interpolation. The spark advance values are stored in memory 35 at a density which provides a good match for the irregularities of the true optimum spark advance characteristics of the engine 10.

The output of summer 37 is connected to the input of dwell control device 17.

In the system of FIG. 1 the various variables are calculated at successive time intervals. $x_{adj}(t)$ denotes the "$t^{th}$" successive value of $x_{adj}$, while $x_{adj}(t+1)$ denotes the value of $x_{adj}$ for the following time interval. This notation will be used for the variables discussed below.

The spark advance values in memory 35 take the form of a fixed schedule which is established from rig-tests on sample engines. For the various reasons which have been outlined above, the optimum spark advance values will differ from those stored in memory 35.

In order to correct these differences, the system estimates two parameters which together define the relationship between the engine output and the spark advance angle and uses these parameters to adjust the spark advance angle to its optimum value.

These two parameters are estimated in a parameter estimator 40 which receives the output y(t) of the torque transducer 9 and a variable $x_{eff}(t)$. These two parameters are calculated for the prevailing engine speed and load demand and pairs of values for these two parameters are stored in a parameter memory 41 as a two dimensional array in a manner similar to that described in our copending U.S. patent application Ser. No. 07/016,790 filed Feb. 20, 1987 having a title of "Method and Apparatus for Controlling an Internal Combustion Engine" and claiming priority from UK patent application No. 8604259. The estimator 40 calculates the covariance P (t+1) of two variables which it uses, and values of this covariance are stored as a two dimensional array in a covariance memory 42. In both of these arrays the abscissa and ordinate represent respectively engine speed and load demand. The memories 41, 42 receive the output of speed calculation device 30 and transducer 31.

For the prevailing engine speed and load demand, the values $\alpha(t+1)$ for the two parameters are supplied by estimator 40 to an ignition timing adjustment device 43. From these two parameters, the device 43 calculates, in accordance with a predetermined rule, the adjustment which is necessary to correct the spark advance angle to its optimum value and supplies this adjustment as a variable $x_{adj}(t+1)$ to a delay device 44. The delay device 44 holds the variable by one time interval and supplies it as $x_{adj}(t)$ to one input of a summer 45 at the following time interval.

Small positive and negative perturbations to the spark advance angle are generated in a periodic manner in a perturbation generator 46 and supplied to the other input of summer 45. At the output of summer 45, there is provided a variable $x_{eff}(t)$, which is the sum of the adjustment calculated in the device 43 and the perturbation produced in the generator 46. The variable $x_{eff}(t)$ is supplied to one input of estimator 40, as mentioned previously, and to the other input of summer 37.

Thus, the output of summer 37 represents the basic spark advance angle calculated in device 36 adjusted by the amount calculated in device 43 to provide the optimum spark advance angle, but with the perturbations from generator 46 superimposed thereon.

In the following description, a knowledge of matrix arithmetic is assumed. Underlining is used to denote a matrix or a vector, and superscripted "T" is used to denote the transpose of a matrix or a vector.

Figure 2:
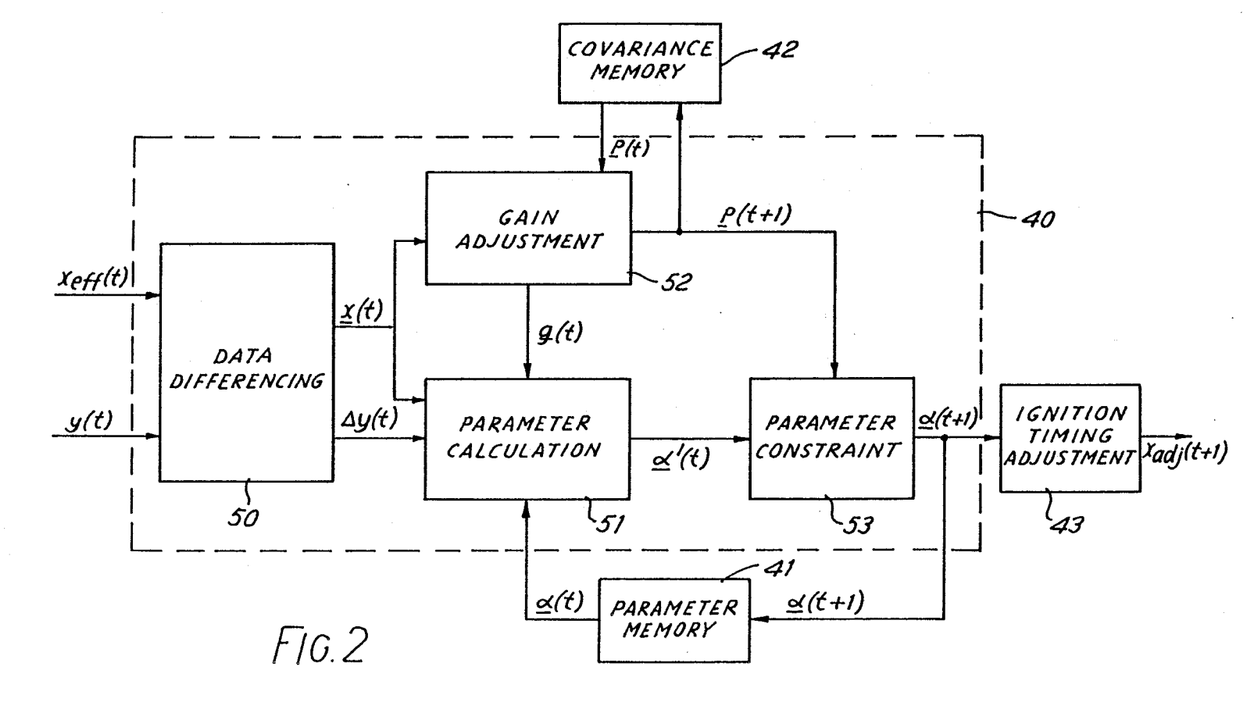
FIG. 2 is a block diagram of a parameter estimator forming part of the adaptive control system of FIG. 1.

Referring to FIG. 2, there is shown a block diagram of the parameter estimator 40. The estimator 40 comprises a data differencing device 50, a parameter calculation device 51, a gain adjustment device 52, and a parameter constraint device 53.

The data differencing device 50 performs a differencing operation on the variables $x_{eff}(t)$ and y(t).

In the parameter calculation device 51, the values of the two parameters $\alpha(t)$ are received from the parameter memory 41 in a similar manner to that used to obtain the spark advance angle from the memory 35 described earlier. The two parameters together with the output x(t) from the data differencing device 50 are used to estimate the change in the engine torque between its present value and preceding value. The error e(t) between the estimated change and the actual change is multiplied by a gain g(t) obtained from the gain adjustment device 52. The resulting product is used to calculate values for the two parameters $\alpha(t)$. Thus these two parameters are calculated by a recursive technique.

In the parameter constraint device 53, constraints are imposed on the estimated values of these two paramaters before they are supplied to the ignition timing adjustment device 43 and parameter memory 41.

Before describing the devices 50 to 53 and the ignition timing adjustment device 43 in detail, some observations will be made concerning recursive techniques for estimating the parameters.

In control systems, the relationship between a control parameter and an output parameter (such as spark advance and torque in the present embodiment) is known as the performance curve and is generally in the form of a simple curve with a single maximum. In order to define a performance curve, three parameters are typically necessary, although more can be used. Three parameters which can be used to describe the performance curve are: (1) the value of the control parameter which gives the maximum value of the output parameter, (2) the maximum output value itself, and (3) a curvature parameter which defines the steepness of the curve.

For the present embodiment, the curvature parameter has a small value if the performance curve is shallow, e.g. a situation in which the torque changes only slightly with changes in the spark advance angle. Similarly, a large value of the curvature parameter will represent a steep performance curve in which the torque changes significantly with changes in the spark advance angle.

The use of the recursive technique to estimate the parameters of the performance curve is not well known but it has been described in two articles, namely: (1) "Adaptive on-line steady-state optimization of slow dynamic processes", Bamberger W. and Isermann R., Automatica, 1978, vol. 14, pages 223-230; and (2) "Adaptive control of extremum systems", Sternby J., International Symposium on Adaptive Systems, Ruhr University Bochum, March 1980. In these articles, a recursive technique is used to estimate not only the three parameters given above but other parameters related to the dynamic or transient behaviour. Neither of these articles is concerned with engine control.

With regard to the recursive technique described in these articles, the applicants have found several difficulties associated with the estimation of the parameters of the performance curve. Firstly, the estimation of three or more parameters requires a large amount of computation which makes the control system undesirably complex. Secondly, if three or more parameters are estimated, then more input data will be required to achieve a given accuracy of the estimates of the individual parameters than is required to achieve the same accuracy when fewer parameters are estimated. Thus, optimization will take longer. Thirdly, the control system may suffer from a problem due to drift of the curvature parameter. As will be described later, drift of the curvature parameter can cause unsatisfactory behaviour.

In order to overcome these difficulties, the applicants have made two improvements to the recursive techniques described in these two articles. As discussed above, in the technique of this embodiment, only two parameters are estimated and this represents the first improvement. This improvement is implemented by the data differencing device 50. The constraints imposed on the parameters by the device 53 represents the second improvement and this improvement overcomes the problems of drift of the curvature parameter. These two improvements can be implemented independently of each other and either improvement will, on its own, provide better performance than the methods described in the two articles. However, when these two improvements are combined, they result in a system which is easy to implement and reliable in practice.

Figure 3:
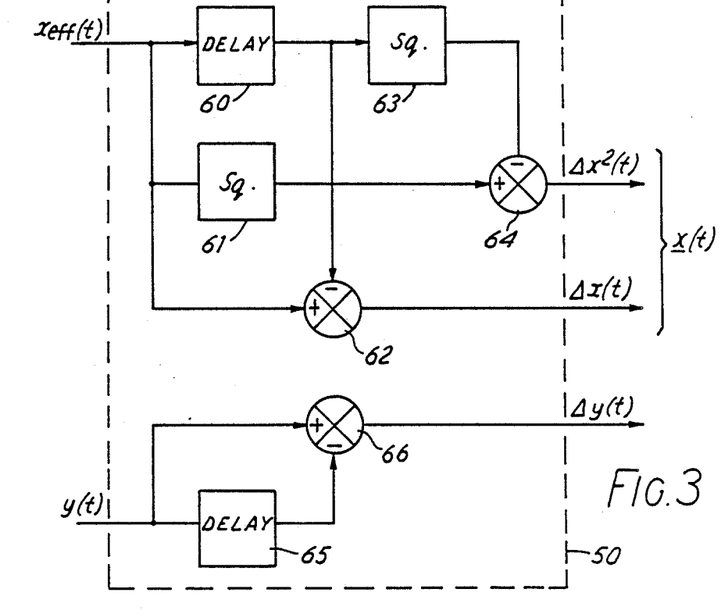
FIGS. 3, 4, 5 and 6 show respectively, in detail, the elements of a data differencing device, a parameter calculation device, a gain adjustment device and a parameter constraint device which collectively form the parameter estimator of FIG. 2.

As shown in FIG. 3, in the data differencing device 50, the variable $x_{eff}(t)$ is supplied to a delay device 60, a squarer 61, and a positive input of a summer 62. In common with the other delay devices which will be described below, device 60 provides a delay of one time interval. The output of delay device 60 is supplied to a negative input of summer 62 and to a squarer 63. The outputs of squarers 61 and 63 are supplied respectively to positive and negative inputs of a summer 62.

Thus, the output of summer 62 provides a difference value $\Delta x(t)$ corresponding to the difference between successive spark advance angles, and the output of summer 64 provides a difference value $\Delta x^2(t)$ corresponding to the difference between the squares of successive spark advance angles. These two values will be denoted by x(t) where $$x(t) = \begin{bmatrix} \Delta x(t) \\ \Delta x^2(t) \end{bmatrix}$$

The variable y(t) is supplied to a delay device 65 and a positive input of a summer 66. The output of delay device 65 is supplied to the negative input of summer 66. Thus, the output of summer 66 provides a difference value $\Delta y(t)$ corresponding to the difference between successive values of the engine torque produced by different spark advance angles.

The data differencing device 50 provides an improvement over the methods described in the articles by Bamberger and Isermann and by Sternby because it eliminates one of the parameters from the estimation. Although it is desired to obtain operation at, or in some relation to, the spark advance angle which gives the maximum torque, it is not necessary to know the value of this maximum torque. The data differencing device 50 eliminates this parameter from the estimation and so simplifies the overall construction of the estimator 40.

In an alternative embodiment, the torque transducer 9 is replaced by means for measuring only the changes in torque between successive sample intervals. Such a technique is attractive because it does not need to measure the absolute value of the torque.

Figure 4:
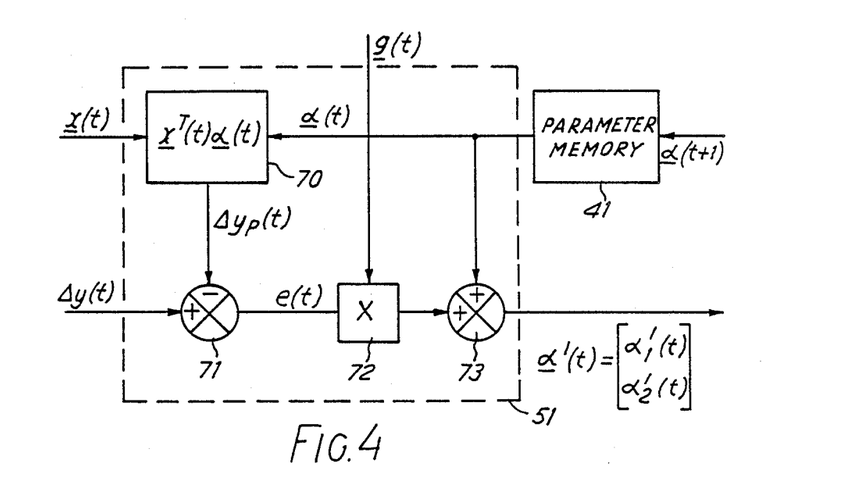

Referring now to FIG. 4, the parameter calculation device 51 receives the difference values x(t) and $\Delta y(t)$ from the device 50 and the gain g(t) from the gain adjustment device 52. This device 51 also receives two constrained estimated values $\alpha(t)$ of the two parameters used to define the performance curve from the parameter memory 41 and provides two unconstrained estimated values $\alpha'(t)$ of these two parameters. $\alpha(t)$ and $\alpha'(t)$ are defined as follows:

$$\alpha(t) = \begin{bmatrix} \alpha_1(t) \\ \alpha_2(t) \end{bmatrix}$$

and $$\alpha'(t) = \begin{bmatrix} \alpha_1'(t) \\ \alpha_2'(t) \end{bmatrix}$$

$\alpha_2(t)$ is the estimated value of the curvature parameter and $\alpha_1(t)$ is the estimated value of a parameter equal to twice the product of the curvature parameter and the value of the spark advance angle which gives maximum torque.

The output $\alpha(t)$ of the parameter memory 41 and the output x(t) of the data differencing device 50 are supplied to a multiplier 70 which forms the product $x^T(t).\alpha(t)$. This product is denoted by $\Delta y_p(t)$ and represents a prediction of $\Delta y(t)$. $\Delta y(t)$ and $\Delta y_p(t)$ are supplied to positive and negative inputs of a summer 71, the output of which forms an error value e(t). The error value e(t) is multiplied by gain g(t) in a multiplier 72. The output of the multiplier 72 is fed to an input of a summer 73, the other input of which is supplied with and thereby added to the preceding constrained estimated values $\alpha(t)$ of the two parameters which define the performance curve so as to adjust these values and to form the present unconstrained estimated values $\alpha'(t)$ of these two parameters.

For example, if the previous estimated values $\alpha(t)$ are correct, e(t) will be zero and no adjustment will be made to these values. Thus, the present (or updated) estimated values $\alpha'(t)$ will be the same as the preceding estimated values $\alpha(t)$.

Figure 5:
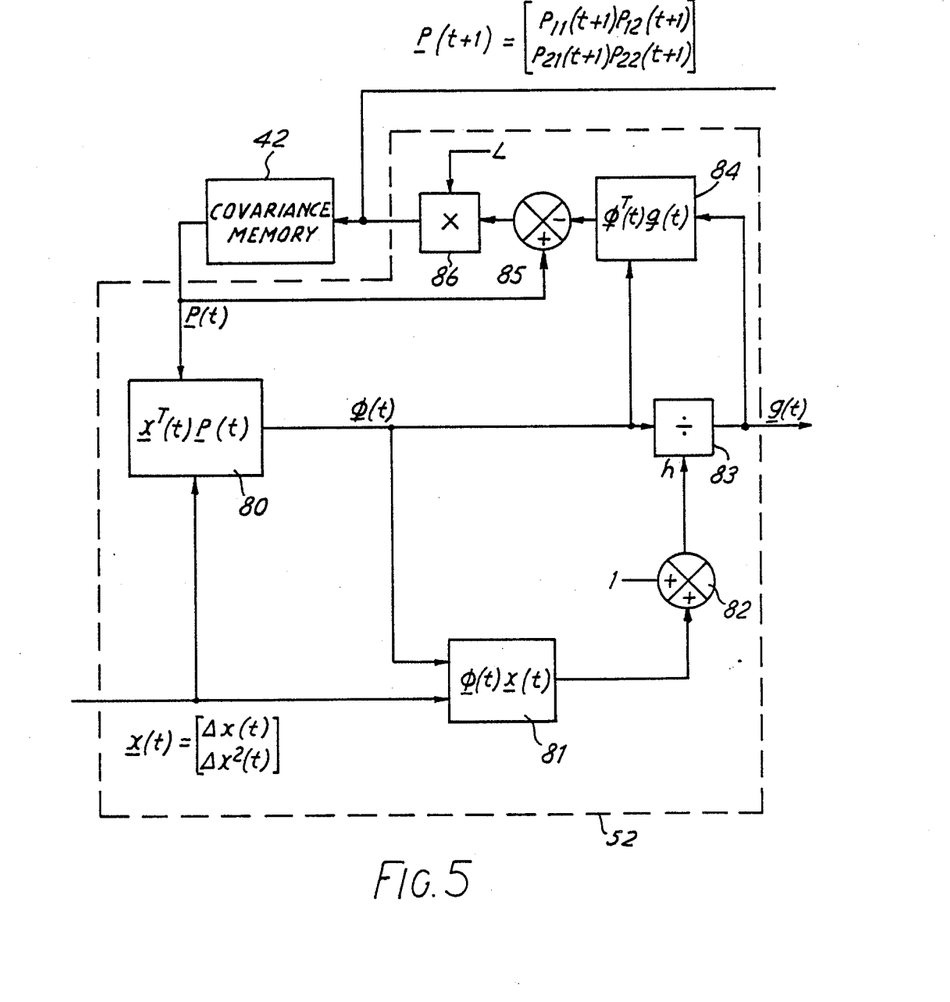

The gain adjustment device 52 sets the adjustment gain g(t). The function of the gain g(t) is to control by how much the preceding estimated values of the two parameters should be changed to form the present estimated values in response to the error e(t).

For example, if the adjustment gain g(t) is large, the estimated values will be changed by correspondingly large amounts. This is a useful property when the estimator 40 is started because the initial estimated values may be a poor representations of the performance curve. It will be appreciated that the starting values of the covariance memory 42 should be set in accordance with standard self-tuning techniques, such as that disclosed in "Recursive Approaches to Time Series Analysis", Young P., Bulletin of the Institute of Mathematics and its Applications, May/June 1974 Vol. 10 pp 209-214.

On the other hand, if the gain g(t) is small, the estimated values will be changed by small amounts. This is the desired behaviour that allows small changes in the performance curve to be identified and corrected.

However, if the gain g(t) falls to zero, there will be no change of the estimated values and therefore no optimization of the spark advance angle. This situation is not desired and is avoided in this embodiment by using the so called "forgetting factor" L. Alternatively, there may be used one of the methods described in "Tracking of Slowly Varying Parameters by Directional Forgetting", Kulhavy R. and Karny M. IFAC Conference, Budapest 1984.

The gain adjustment device 52 receives the difference values x(t) and uses and continuously updates the covariance values of $\Delta x(t)$ and $\Delta x^2(t)$. The covariance values take the form of a covariance matrix P(t) defined as $$P(t) = \begin{bmatrix} P_{11}(t) & P_{12}(t) \\ P_{21}(t) & P_{22}(t) \end{bmatrix}$$

where $P_{11}(t)$, $P_{12}(t)$, $P_{21}(t)$ and $P_{22}(t)$ are the individual elements of the matrix. In the device 52 shown in FIG. 5, $x^T(t)$ is multiplied by P(t) in a multiplier 80 to form a vector $\phi(t)$. $\phi(t)$ is multiplied by x(t) in a multiplier 81, and the result is increased by 1 to give a divisor h. $\phi(t)$ is divided by h to obtain the gain g(t). This is then supplied to the device 51.

The gain g(t) is used to update the covariance matrix P(t) as follows.

The product of $\phi^T(t)$ and g(t) is formed in a multiplier 84 and then subtracted from P(t) in a summer 85. The output of summer 85 is multiplied by the forgetting factor L in a multiplier 86 to provide the updated covariance matrix P(t+1) which is supplied to the covarience memory 42 and also the parameter constraint device 53.

As stated earlier, the curvature parameter may drift and drift of this parameter can result in unsatisfactory operation of the entire control system. This is particularly so if the measurements of torque are erratic or subject to random errors when the optimum spark angle changes. Such erratic or variable measurements are inevitable in practice and may, for example, be due to engine misfires, fluctuations in air/fuel ratio, electrical interference, uneven road surfaces and mechanical vibrations.

The recursive technique described above will reduce the effects of these measurement errors. However, if the performance curve, and hence the parameters which define it, change suddenly, the response of the estimator will be slow. The applicants have found that, during this slow response, the curvature parameter will reduce in size, thus representing a shallow curve. This shallower curve is in some way the average of a new performance curve and the old performance curve but it is unexpectedly more shallow than both the old curve and the new curve. Hence, the estimated values of the parameters which define the performance curve do not move smoothly and directly from the old values to the new values. Instead, there is a decrease of the curvature parameter.

A small curvature parameter will cause the ignition timing adjustment device to make large and erratic adjustments to the spark advance angle. Furthermore, in some cases the curvature parameter may fall through zero and change sign. In this case, the device 43 may select extreme values for the spark advance angle, which are at or beyond the limits of those that can be achieved. This behaviour is unsatisfactory and the control system may take a long time to recover.

Figure 6:
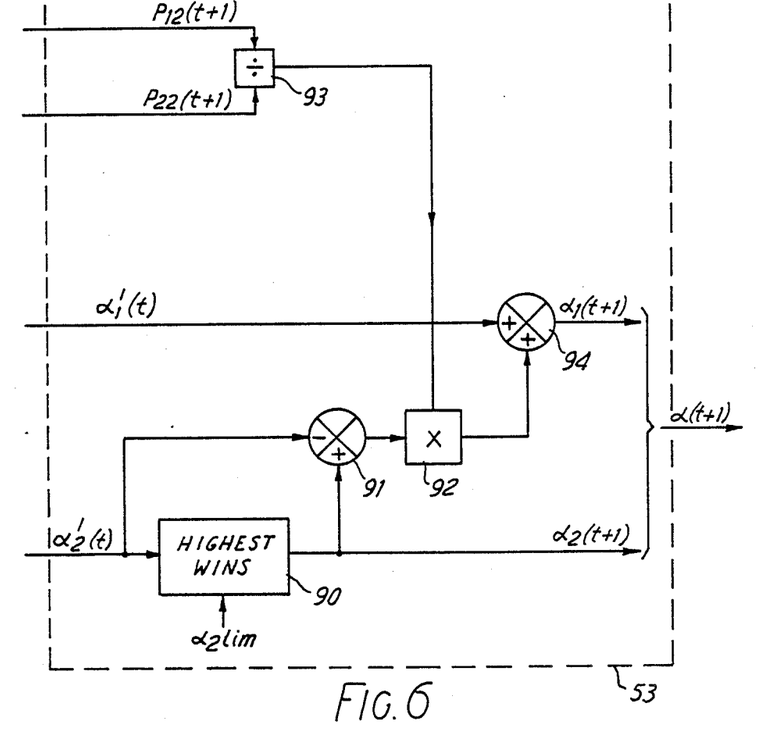

The parameter constraint device 53 prevents the estimate of the curvature parameter becoming too small and thus eliminates the erratic adjustment which might otherwise occur. The technique used by the device has been adapted from the mathematical method described in "Adaptive Filtering Prediction and Control", Goodwin G. C. and Sin K. S., Prentice-Hall 1984. Goodwin and Sin suggest a method for correcting estimated parameters which have values that lie outside limits within which the correct value of the parameter is known to lie.

If the estimated value of the curvature parameter becomes smaller than a certain value, $\alpha_2 \text{lim}$, the device 53 will set the estimated value to that value and modify the estimated values of the other parameters. $\alpha_2 \text{lim}$ represents the shallowest curvature that can occur, possibly though not necessarily as a function of load and speed.

Referring to FIG. 6, the unconstrained estimated value $\alpha_2'(t)$ is supplied to one input of a highest wins device 90. The other input of the device 90 receives the value $\alpha_2 \text{lim}$. If $\alpha_2'(t)$ is greater than $\alpha_2 \text{lim}$, the output of device 90 is equal to $\alpha_2'(t)$. If $\alpha_2'(t)$ is less than $\alpha_2 \text{lim}$, the output is set to $\alpha_2 \text{lim}$. The output of device 90 represents the constrained estimated value $\alpha_2(t+1)$ of the curvature parameter. $\alpha_2'(t)$ is subtracted from $\alpha_2(t+1)$ and the resulting difference value is multiplied in a multiplier 92 by the ratio of the covariance elements, $P_{12}(t+1)/P_{22}(t+1)$, obtained from a divider 93.

$P_{12}(t+1)$ is the element of the covariance matrix $P(t+1)$ associated with the covariance of the estimated value $\alpha_2(t)$ of the curvature parameter and the estimated value $\alpha_1(t)$ of the other parameter, whereas $P_{22}(t+1)$ is the element associated solely with the variance of the estimated value $\alpha_2(t)$ of the curvature parameter. The output of multiplier 92 is added in a summer 94 to $\alpha_1'(t)$ to form a constrained estimated value $\alpha_1(t+1)$ of the other parameter. Thus, the estimated value of the curvature parameter has been constrained and the estimated value of the other parameter has been adjusted in a direction defined by $P_{12}(t+1)$ and by an amount in proportion to $P_{12}(t+1)/P_{22}(t+1)$ and to the extent the limit on the curvature parameter has been exceeded. This constraining action improves the estimation of new values of the two parameters which define the performance curve.

The values $\alpha_1(t+1)$ and $\alpha_2(t+1)$ are supplied to devices 41 and 43 as previously mentioned.

The ignition timing adjustment device 43 uses the values $\alpha_1(t+1)$ and $\alpha_2(t+1)$ to calculate, in accordance with a predetermined rule, the adjustment $x_{adj}(t+1)$ which is necessary to the spark advance angle to achieve its optimum value. There are various possibilities for this predetermined rule. For example, if maximum torque is required, $x_{adj}(t+1)$ is calculated as $\alpha_1(t+1)/2\alpha_2(t+1)$. Alternatively, a small offset can be used to keep the timing just less than peak torque if it is desired to avoid an undesirable engine operating condition such as knock.

The concepts discussed above can be applied to optimising other control parameters. For example, these concepts may be applied to controlling the air/fuel ratio of the mixture composition of the spark ignition engine. In this case, the perturbation generator perturbs the air flow into the engine. Other examples of parameters that can be controlled are injection timing and quantity of fuel injected in a compression ignition engine.

The applicants have found that the curvature parameter of the performance curve relating torque to spark advance angle is indicative of mixture composition. With the modification shown in FIG. 7, it is possible to provide simultaneous control of the spark advance angle and the mixture composition. The spark advance angle is controlled as described above.

Figure 7:
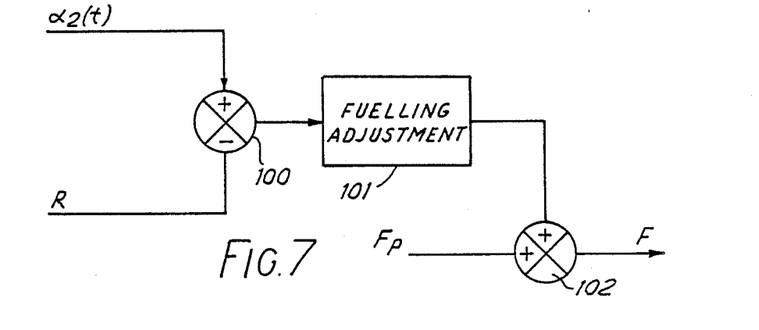
FIG. 7 is a block diagram illustrating the application of the control system of FIG. 1 to fuelling adjustment.

Referring to FIG. 7 the constrained estimate value $\alpha_2(t)$ of the curvature parameter is compared in a summer 100 with a reference value R which has been empirically established during engine tests and which may be a function of engine speed and load. The error signal produced by summer 100 is supplied to a fuel adjustment controller 101, which may be of an integral type, to develop a fuelling correction signal. This signal is added to a fuelling signal $F_p$, supplied as a function of speed and load in well known manner, in a summer 102 to provide an output fuelling signal F. Any error in the curvature parameter in comparison to the reference value R will be integrated and will thus produce a change in mixture composition, thereby forcing the error to become smaller. Alternatively, the unconstrained estimate value $\alpha_2'(t)$ could be used in place of the constrained estimate value $\alpha_2(t)$. However, as previously described, errors which may occur in this value make its use less suitable.

In the embodiment described above, the parameters which define the performance curve relating torque to spark advance angle are estimated and used to control the spark advance angle. Thus, the controlled parameter is one of the two parameters forming the relationship defined by the performance curve. However, it would be possible to apply the present invention to the control of a parameter which is not one of the two parameters forming this relationship. For example, it would be possible to estimate two parameters which define the relationship between an engine output such as torque and an ignition timing parameter such as spark advance angle and to use these parameters to correct a fuelling parameter such as the air/fuel ratio of the mixture composition.

While, in the described example, the parameter and covariance memories comprise many sites addressed by speed and load, it will be appreciated that a single memory site for all speed and load values could be used for the parameter and covariance values $\alpha(t+1)$ and $P(t+1)$, respectively. However, such a system would require very accurate torque measurements to ensure a sufficiently rapid response to changes arising from different speeds and loads.

I claim:

1. An adaptive control system for an internal combustion engine having at least one engine control input and at least one engine output, said control system comprising;
    measuring means for measuring a value of said at least one engine output;
    supplying means for supplying a value of said at least one engine control input to said input;
    first determining means, responsive to said supplying means, for determining a value of said at least one engine output as a predetermined function of said value of said at least one engine control input supplied by said supplying means, said predetermined function having at least two parameters, each of said two parameters having a base value;
    comparing means, responsive to said measuring means and said first determining means, for comparing the measured value of said at least one engine output from said measuring means with the determined value of said at least one engine output from said determining means and for providing an output;
    adjusting means, responsive to said comparing means output, for adjusting said base values of each of said at least two parameters; and
    second determining means, responsive to said adjusting means, for adjusting said at least one value of said engine control input in order to provide a desired comparing means output.

2. A system as claimed in claim 1, in which said second determining means comprises:
    means, responsive to said adjusting means, for determining a correction value; and
    means for adding said correction value to said value of said at least one engine control input so as to form a corrected value of said at least one engine control input.

3. A system as claimed in claim 1, further comprising perturbation generating means for superimposing a perturbation on the value of said at least one engine control input supplied by said supplying means, said measuring means measuring a change in the engine output resulting from the perturbation.

4. A system as claimed in claim 3, in which said first determining means comprises a means for determining a value of said at least one engine output as a derivative with respect to said at least one engine control input of a quadratic function of a change of said at least one value of the engine control input, and said at least two parameters comprise two parameters.

5. A system as claimed in claim 4, in which said two parameters represent curvature and location of a maximum of the quadratic function.

6. A system as claimed in claim 5, in which said measuring means includes means for calculating successive sets of difference values, each set of difference values comprising
    (a) a value indicative of a difference between a present value and a preceding value of said at least one engine control input,
    (b) a value indicative of a difference between the square of the present value and the square of the preceding value of said at least one engine control input, and
    (c) a value indicative of a difference between a present value and a preceding value of said at least one engine output.

7. A system as claimed in claim 6, in which said adjusting means includes:
    (a) means for storing values of the two parameters as a function of engine operating conditions,
    (b) means for calculating adjusted values of said two parameters based upon stored values of the two parameters for prevailing engine conditions and from a prevailing set of difference values, and
    (c) means for replacing said stored values of said two parameters at the prevailing engine conditions with said adjusted values of the two parameters.

8. A system as claimed in claim 7, in which said adjusting means includes means for constraining the adjusted values of said two parameters calculated by said calculating means.

9. A system as claimed in claim 1, in which said at least one engine control input is an ignition timing control input.

10. A system as claimed in claim 1, in which said second determining means further comprises means for determining a corrected value of a further engine control input.

11. A system as claimed in claim 10, in which said at least one engine control input comprises two engine control inputs, one of said engine control inputs is an ignition timing control input and another of said engine control inputs is a fueling control input.

12. An adaptive control system for an internal combustion engine having at least two engine control inputs and at least one engine output, said control system comprising;
measuring means for measuring a value of said at least one engine output;
supplying means for supplying a value of a first engine control input to one of said inputs;
first determining means, responsive to said supplying means, for determining a value of said at least one engine output as a predetermined function of said value of said first engine control input supplied by said supplying means, said predetermined function having at least two parameters each of said two parameters having a base value;
comparing means, responsive to said measuring means and said first determining means, for comparing the measured value of said at least one engine output from said measuring means with the determined value of said at least one engine output from said determining means and for providing an output;
adjusting means, (a) responsive to said comparing means output, for adjusting said base values of each of said at least two parameters, and (b) responsive to said adjusting of said base values, for adjusting said value of said first engine control input; and
second determining means, responsive to said adjusting means, for adjusting a value of said second engine control input in order to provide a desired comparing means output.

13. A system as claimed in claim 12, in which said first engine control input is an ignition timing control input and the second engine control input is a fueling control input.

14. An adaptive control method for an internal combustion engine having at least one engine control input and at least one engine output, said method comprising;
measuring a value of said at least one engine output;
supplying a value of said at least one engine control input to said input;
determining a value of said at least one engine output as a predetermined function of said value of said at least one engine control input, said predetermined function having at least two parameters, each of said two parameters having a base value;
comparing the measured value of said at least one engine output with the determined value of said at least one engine output and providing a comparison output;
adjusting said base values of each of said at least two parameters based upon said comparison output; and
adjusting, in response to said adjusted base values of each of said two parameters, said at least one value of said engine control input in order to provide a desired comparison output.

15. A method as claimed in claim 14, in which said second adjusting step includes the steps of determining a correction value and adding said correction value to said value of said at least one engine control input so as to form a corrected value of said at least one engine control input.

16. A method as claimed in claim 14, further comprising the further step of superimposing a perturbation on the value of said at least one engine control input, said measuring step comprising measuring a change in the engine output resulting from the perturbation.

17. A method as claimed in claim 16, in which said determining step comprises determining a value of said at least one engine output as a derivative with respect to said at least one engine control input of a quadratic function of a change of said at least one value of the engine control input and said at least two parameters comprise two parameters.

18. A method as claimed in claim 17, in which said two parameters represent curvature and location of a maximum of the quadratic function.

19. A method as claimed in claim 18, in which said measuring step includes calculating successive sets of difference values, each set of difference values comprising
(a) a value indicative of a difference between a present value and a preceding value of said at least one engine control input,
(b) a value indicative of a difference between the square of the present value and the square of the preceding value of said at least one engine control input, and
(c) a value indicative of a difference between a present value and a preceding value of said at least one engine output.

20. A method as claimed in claim 19, in which said first adjusting step includes the steps of
(a) storing values of the two parameters as a function of engine operating conditions,
(b) calculating adjusted values of said two parameters based upon stored values of the two parameters for prevailing engine conditions and from a prevailing set of difference values, and
(c) replacing said stored values of said two parameters at the prevailing engine conditions with said adjusted values of the two parameters.

21. A method as claimed in claim 20, in which said first adjusting step includes the further step of constraining the adjusted values of said two parameters.

22. A method as claimed in claim 14, in which said at least one engine control input is an ignition timing control input.

23. A method as claimed in claim 14, in which said second adjusting step determines a corrected value of a further engine control input.

24. A method as claimed in claim 23, in which said at least one engine control input comprises two engine control inputs, one of said engine control inputs is an ignition timing control input and another of said engine control inputs is a fueling control input.

25. An adaptive control method for an internal combustion engine having at least two engine control inputs and at least one engine output, said control system comprising;
measuring a value of said at least one engine output;
supplying a value of a first one engine control input to one of said inputs;
determining a value of said at least one engine output as a predetermined function of said value of said first one engine control input in said supplying step, said predetermined function having at least two parameters, each of said two parameters having a base value;

comparing the measured value of said at least one engine output with the determined value of said at least one engine output and providing a comparison output;

adjusting, in response to said comparison output, said base values of each of said at least two parameters; and adjusting, in response to said adjusted base values of each of said two parameters, at least one value of a second engine control input in order to provide a desired comparison output.

26. A method as claimed in claim 25, in which said first engine control input is an ignition timing control input and the second engine control input is a fueling control input.

* * * * *